(12) United States Patent
Costea et al.

(10) Patent No.: US 7,861,296 B2
(45) Date of Patent: Dec. 28, 2010

(54) SYSTEM AND METHOD FOR EFFICIENTLY SCANNING A FILE FOR MALWARE

(75) Inventors: Mihai Costea, Redmond, WA (US); Adrian Bivol, Redmond, WA (US); Adrian M. Marinescu, Sammamish, WA (US); Anil Francis Thomas, Redmond, WA (US); Cenk Ergan, Bellevue, WA (US); David Goebel, Seattle, WA (US); George C. Chicioreanu, Redmond, WA (US); Marius Gheorghe Gheorghescu, Redmond, WA (US); Michael R. Fortin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1107 days.

(21) Appl. No.: 11/154,267

(22) Filed: Jun. 16, 2005

(65) Prior Publication Data

US 2006/0288416 A1     Dec. 21, 2006

(51) Int. Cl.
  *G06F 11/00* (2006.01)
(52) U.S. Cl. .......................... 726/22; 726/24
(58) Field of Classification Search ............. 726/22–25; 713/188
  See application file for complete search history.

(56) References Cited

U.S. PATENT DOCUMENTS

| | | | | |
|---|---|---|---|---|
| 5,473,769 A | * | 12/1995 | Cozza | .......................... 714/39 |
| 5,577,224 A | * | 11/1996 | DeWitt et al. | ................ 711/118 |
| 6,021,510 A | * | 2/2000 | Nachenberg | .................. 714/38 |
| 6,094,731 A | * | 7/2000 | Waldin et al. | ................. 714/38 |
| 6,735,700 B1 | * | 5/2004 | Flint et al. | ..................... 726/24 |
| 6,763,466 B1 | * | 7/2004 | Glover | ......................... 726/24 |
| 6,973,578 B1 | * | 12/2005 | McIchionc | .................... 726/24 |
| 7,036,147 B1 | * | 4/2006 | Hursey | ......................... 726/24 |
| 7,251,830 B1 | * | 7/2007 | Melchione | .................... 726/24 |
| 7,367,056 B1 | * | 4/2008 | Szor et al. | ...................... 726/24 |
| 2003/0101381 A1 | * | 5/2003 | Mateev et al. | .................. 714/38 |
| 2003/0110387 A1 | * | 6/2003 | Cowie et al. | ................. 713/190 |
| 2005/0132205 A1 | * | 6/2005 | Palliyil et al. | ................ 713/188 |
| 2006/0236396 A1 | * | 10/2006 | Horne | .......................... 726/24 |

* cited by examiner

*Primary Examiner*—Nirav Patel
(74) *Attorney, Agent, or Firm*—Workman Nydegger (57) ABSTRACT

The present invention is directed toward a system, method, and a computer-readable medium for efficiently loading data into memory in order to scan the data for malware. The logic provided in the present invention improves the experience of a user when operating a computer protected with antivirus software. One aspect of the present invention is a method that identifies a pattern in which data in a file is loaded into memory from a computer-readable medium. Then the method identifies a pattern in which data in the file may be loaded into memory in a way that minimizes the time required to read data in the file. When a subsequent scan of the file is scheduled to occur, the method causes data in the file to be loaded in memory using the pattern that minimizes the time required to read data in the file.

16 Claims, 5 Drawing Sheets

| FILE DESCRIPTOR | FIRST BIT | SECOND BIT |
|---|---|---|
| 0X1001 | 1 | 0 |
| 0X1002 | 1 | 0 |
| 0X1003 | 1 | 0 |
| 0X1004 | 0 | 1 |
| 0X1005 | 0 | 0 |

| FILEINDX | TYPE | OFFSET | SIZE |
|---|---|---|---|
| 0X1001 | .DOC | 1024 | 128 |
|  |  | 128 | 512 |
| 0X1001 | .JPEG | 64 | 2048 |
|  |  | 128 | 1024 |
|  |  | 512 | 256 |

*Fig.6.* ns of the present invention is a method of effi-
SYSTEM AND METHOD FOR EFFICIENTLY SCANNING A FILE FOR MALWARE

FIELD OF THE INVENTION

The present invention relates to computers and, more particularly, to efficiently scanning a file stored on a computer for malware.

BACKGROUND OF THE INVENTION

As more and more computers and other computing devices are interconnected through various networks such as the Internet, computer security has become increasingly more important, particularly from invasions or attacks delivered over a network or over an information stream. As those skilled in the art and others will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks, such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is antivirus software that is available from numerous software vendors. Most antivirus software identifies malware by matching patterns within data to what is referred to as a "signature" of the malware. Typically, antivirus software scans for malware signatures when certain events are scheduled to occur, such as when data is going to be written or read from a computer-readable medium on the computer. As known to those skilled in the art and others, computer users have ongoing needs to read and write data to computer-readable mediums, such as a hard drive. For example, a common operation provided by some software applications is to open a file stored on a hard drive and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

In order to scan a file for malware, an operating system installed on the computer loads file data from a computer-readable medium into system memory that is accessible to the Central Processing Unit ("CPU"). The CPU performs essential operations on behalf of the antivirus software in searching for malware. Those skilled in the art and others will recognize that loading file data from a computer-readable medium into system memory is often a "bottleneck" in a computers performance. As a result, a CPU frequently remains idle, waiting to perform operations while data is being loaded into system memory.

While computer-readable mediums are typically inexpensive to produce and store vast quantities of data, reading and/or writing data from this type of device is slow when compared to reading and/or writing data from system memory. A primary reason why reading and/or writing data using a computer-readable medium is slow stems from the fact that this type of device employs a read/write head that typically uses electromechanical means to interact with a media where data is stored. Those skilled in the art and others will recognize that a read/write head is only able to read data when media with which it interacts spins under the read/write head. The physical movement of media in passing underneath a read/write head is slow when compared to mechanisms used to read/write data from more expensive system memory. As a result, modem computer systems typically implement optimizations designed to minimize the time required to read and/or write data from a computer-readable medium. For example, data in a file will typically be defragmented or arranged contiguously on a computer-readable medium to minimize the number of "seek" operations in which data from disparate locations on a computer-readable medium is required to pass under a read/write head.

For a variety of reasons, scanning a file for malware is a resource intensive task that limits the speed in which programs may be executed. One reason that scanning a file for malware is a resource intensive task results from the fact that antivirus software may not access data in a file contiguously. Instead, when scanning a file for malware, some antivirus software only scans data that is needed to determine whether the file is infected and may request data in the file without regard to where the data is located. Thus, antivirus software may initially request and obtain data that is located at the end of the file and then make subsequent requests for data that is located in other parts of the file. As a result, numerous "seek" operations are performed to determine whether a file is infected with malware.

SUMMARY OF THE INVENTION

The foregoing problems with the state of the prior art are overcome by the principles of the present invention, which are directed toward a system, method, and a computer-readable medium for efficiently loading data from a file into system memory in order to scan the file for malware. The logic provided by the present invention reduces the resources required by antivirus software to scan a file for malware and thereby improves the experience of a user when operating a computer protected by the antivirus software.

One aspect of the present invention is a method of efficiently loading data into system memory from a computer-readable medium for purposes of malware detection. More specifically, when antivirus software scans a file for malware, the method (1) identifies a pattern in which data in the file is loaded into system memory from a computer-readable medium; (2) identifies a pattern in which data in the file may be loaded into system memory that minimizes the time required to read data in the file; and (3) in a subsequent scan of the file for malware, causes data in the file to be loaded into system memory in accordance with the pattern that minimizes the time required to read data in the file.

In yet another aspect of the present invention, a software system for efficiently scanning a file for malware is provided. Components of the software system include (1) a scan engine for identifying data that is characteristic of malware; (2) a persistent data store that tracks the segments of data that are loaded into system memory when a scan of the file for malware is performed; and (3) an efficient scan module operative to optimize the way in which data is loaded into system memory when a file will be scanned for malware by the scan engine.

In still another embodiment, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed toward a system, method, and a computer-readable medium for efficiently loading data from a file into system memory in order to scan the data for malware. The logic provided in the present invention improves the experience of a user when operating a computer protected with antivirus software by efficiently scanning data on the computer for malware. One aspect of the present invention is a method that identifies a pattern in which data in a file is loaded into system memory from a computer-readable medium. Then the method identifies a pattern in which data in the file may be loaded into system memory in a way that minimizes the time required to read data in the file. When a subsequent scan of the file is scheduled to occur, the method causes data in the file to be loaded in memory using the pattern that minimizes the time required to read data in the file.

The present invention may be described in the general context of computer-executable instructions, such as program modules, being executed by a computer. Generally described, program modules include routines, programs, objects, components, data structures, and so forth that perform particular tasks or implement particular abstract data types. The invention may also be practiced in distributed computing environments where tasks are performed by remote processing devices that are linked through a communications network. In a distributed computing environment, program modules may be located in local and/or remote computer storage media.

While the present invention will primarily be described in the context of efficiently scanning one or more files for malware, those skilled in the relevant art and others will recognize that the present invention is also applicable to other areas than those described. For example, the present invention may be used to efficiently scan units of data other than a file for malware. In any event, the following description first provides an overview of a system in which the present invention may be implemented. Then a method that implements the present invention is described. The illustrative examples provided herein are not intended to be exhaustive or to limit the invention to the precise forms disclosed. Similarly, any steps described herein may be interchangeable with other steps or combinations of steps in order to achieve the same result.

Figure 1:
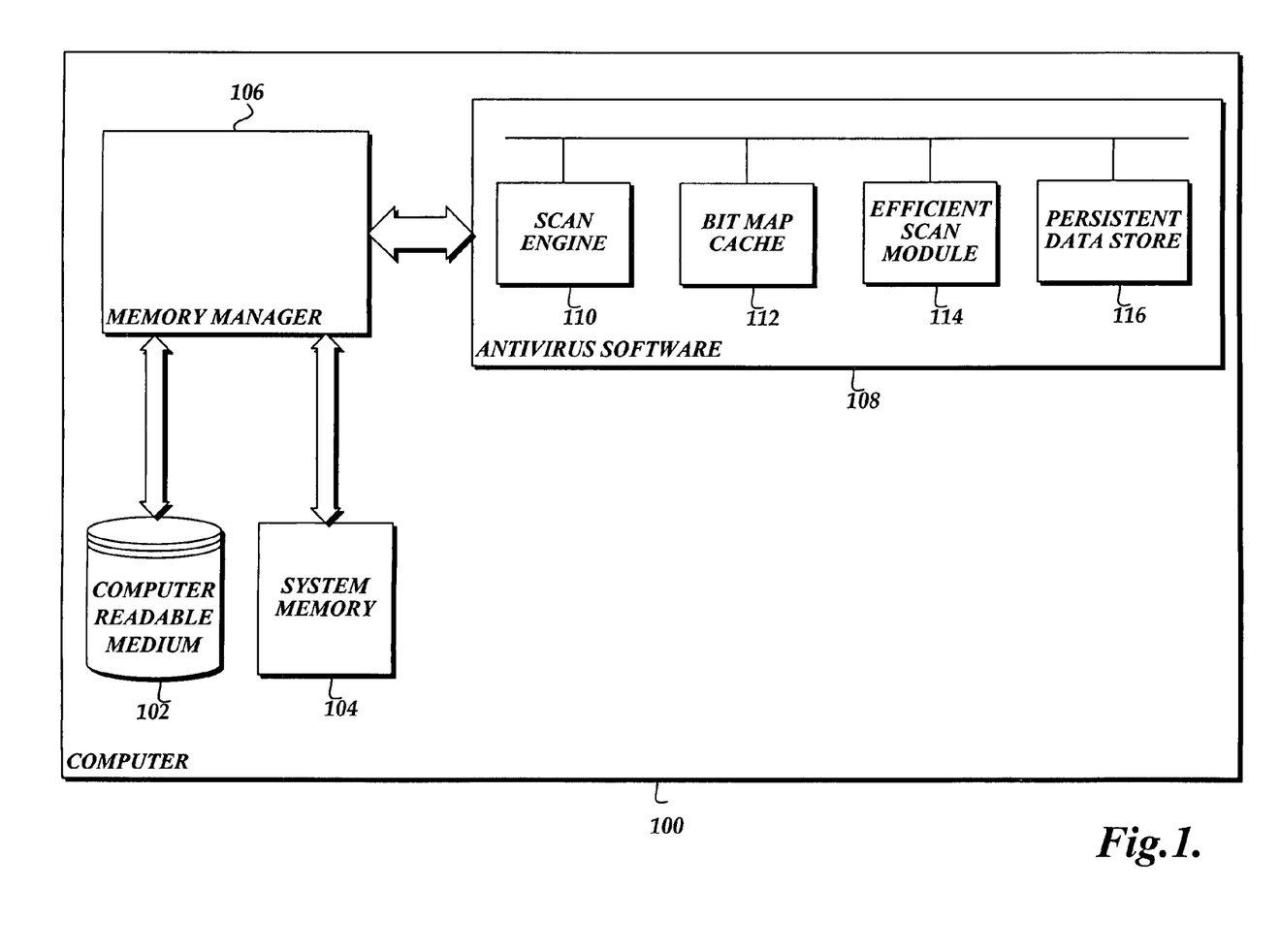
FIG. 1 is a block diagram of a computer with software components that are configured to efficiently load data into system memory in accordance with the present invention.

Now with reference to FIG. 1, components of a computer 100 that are capable of implementing aspects of the present invention will be described. Those skilled in the art and others will recognize that the computer 100 may be any one of a variety of devices including, but not limited to, personal computing devices, server-based computing devices, mini- and mainframe computers, or other electronic devices having some type of memory. For ease of illustration and because it is not important for an understanding of the present invention, FIG. 1 does not show the typical components of many computers, such as a CPU, keyboard, a mouse, a printer, or other I/O devices, a display, etc. However, as illustrated in FIG. 1, the computer 100 does include a computer-readable medium 102, system memory 104, a memory manager 106, and antivirus software 108. Also, as illustrated in FIG. 1, the antivirus software 108 includes a scan engine 110, a bit map cache 112, an efficient scan module 114, and a persistent data store 116. However, those skilled in the art and others will recognize that the computer 100 and antivirus software 108 illustrated in FIG. 1 are highly simplified examples which only illustrate components that are necessary for an understanding of the present invention. In actual embodiments of the present invention, the computer 100 and the antivirus software 108 will have additional components that are not illustrated in FIG. 1. Thus, the computer 100 is only one example of a computer capable of implementing aspects of the present invention and is not intended to suggest any limitation as to the scope of use or functionality of the invention.

In general terms, the present invention performs optimizations designed to improve the efficiency of antivirus software in scanning for malware. As described in more detail below, the optimizations performed include efficiently reading data from a computer-readable medium 102 into the system memory 104, using heuristics to "pre-fetch" data into system memory 104, and performing load balancing to efficiently allocate limited resources when scanning a plurality of files for malware.

As illustrated in FIG. 1, the computer 100 includes a computer-readable medium 102 that may be any available media that is accessible by the computer 100 and includes both volatile and nonvolatile media and removable and non-removable media. By way of example and not limitation, the computer-readable medium 102 may be volatile or nonvolatile, removable or nonremovable, implemented using any technology for storage of information such as, but not limited to a hard drive, CD-ROM, DVD, or other disk storage, magnetic cassettes, magnetic tape, magnetic disk storage, or any other media that can be used to store the desired information and may be accessed by the computer 100 even through a computer network. Combinations of any of the media described above should also be included within the scope of a computer-readable medium.

The computer 100 also includes system memory 104 that may be volatile or nonvolatile memory, such as Read Only Memory ("ROM"), Random Access Memory ("RAM"), or other storage system that is readily accessible to a CPU on the computer. Those skilled in the art and others will recognize that ROM and RAM typically contain data and/or program modules that are immediately accessible to and/or currently being operated on by the CPU.

As mentioned previously, in order to scan a file for malware, a component of an operating system installed on the computer 100 loads file data from a computer-readable medium 102 into system memory 104 that is accessible to a CPU (not illustrated). However, loading file data from the computer-readable medium 102 into the system memory 104 is often a "bottleneck" in a computer's performance. As a result, in the prior art, a CPU frequently remains idle, waiting to perform operations on behalf of antivirus software while data is being loaded into the system memory 104.

Those skilled in the art and others will recognize that a CPU serves as the computational center of the computer 100 by supporting the execution of program code including program code implemented by the present invention. Most malware carry out their malicious functionality when malware program code is loaded into system memory 104 and then "executed" by the CPU.

To protect a computer from malware, the antivirus software 108 is configured to scan for malware "on access" when an application program is scheduled to be executed. For example, a computer user may issue a command to start execution of an application program by "double clicking" on an icon associated with the program or by selecting the program through other means. In this instance, a request to perform input/output ("I/O") with a hardware device, such as the computer-readable medium 102, is typically generated by an application program. Prior to the request being satisfied, the antivirus software 108 is notified that the I/O request occurred. In response, the antivirus software 108 will cause one or more files associated with the application program to be scanned "on access" when data that implements the program is loaded into system memory 104 but prior to the data being executed. Only when the antivirus software 108 does not identify malware in the data is the application program allowed to execute.

Also, the antivirus software 108 will typically be configured to scan all or any number of the files on the computer-readable medium 102 "on demand" in response to a command. In this instance, certain data from files that are scheduled to be scanned for malware are loaded into system memory 104 and scanned for malware by the antivirus software 108. In accordance with one embodiment, when a plurality of files is scheduled to be scanned "on-demand," the present invention causes data to be read into memory in a way that optimizes the resources of the computer. For example, files that are of types that are known to the "CPU bound" are scheduled to be read into system memory and scanned with files that are a type that are known to be "I/O bound." As described in further detail below, by scheduling files in this way, aspects of the present invention minimize the number of idle CPU cycles that occur when performing in "on-demand" scan for malware.

The present invention may be implemented in conjunction with antivirus software that performs a scan for malware "on access" and/or "on demand" to improve the speed in which a scan is performed. However, aspects of the present invention may cause a scan for malware to be performed in other instances than those described above. For example, as described in further detail below, aspects of the present invention may be used in conjunction with a memory manager 106 that uses heuristics to "pre-fetch" data into system memory 104 in anticipation that a user will cause a particular application program to be executed.

As illustrated in FIG. 1, the computer 100 includes a memory manager 106 that operates in conjunction with a computer operating system (not illustrated) to manage memory on behalf of the computer 100. For example, currently existing memory managers typically provide a virtual memory address space so that the amount of storage space available to an application program is larger than the storage space provided by the system memory 104. When an application program executes, the virtual memory addresses used by the application program are converted into physical memory addresses by the memory manager 106 so that necessary data may be swapped into system memory 104.

As mentioned previously, in order to execute an application program, data is read from the computer-readable medium 102 and loaded into the system memory 104 where it is accessible to a CPU. However, a launch of an application program, in which all of the necessary data is read from the computer-readable medium 102 when a user selects the program is time consuming. The delay in application launch is primarily caused by data transfers necessary to read the data from the computer-readable medium 102. During the time when data is being read, the CPU may be blocked, waiting for the necessary data to become accessible. However, the memory manager 106 performs optimizations that are designed to "pre-fetch" data stored on the computer-readable medium 102 into system memory 104 based on the expected needs of the user. Stated differently, the memory manager 106 works to provide performance improvements in memory management by loading and maintaining data in system memory 104 that is likely to be needed before the data is actually needed. Units of data typically known as pages are prioritized with a value/score that is computed using a variety of factors, including the frequency of use, time of last use, ease of data transfer and other context-based information. The memory manager 106 works to pre-fetch and/or maintain the more valuable pages of data in memory. If a program needs to be swapped out or overwritten, a page of data may be automatically brought back into system memory 104, not because of actual demand, but rather because of expected demand. By having the system memory 104 filled with valuable data before the data is needed, the memory manager 106 substantially reduces or eliminates transfer operations from the computer-readable medium 102. In this regard, a detailed explanation of a method and mechanisms that "pre-fetches" or loads and maintains pages of data in system memory based on the expected demands of the user may be found in commonly assigned, copending U.S. patent application Ser. No. 10/952,336, entitled "Methods and Mechanisms for Proactive Memory Management," the content of which is expressly incorporated herein by reference.

The antivirus software 108 in which aspects of the present invention may be implemented includes a scan engine 110 designed to detect data that is characteristic of malware. Many different software vendors include a scan engine or similar software module in antivirus software. One known technique employed by some existing scan engines that is used to identify data characteristic of malware includes obtaining a copy of the malware "in the wild." Then the data that implements the malware is processed with a hash function that converts the data or a characteristic subset of the data into a signature that uniquely identifies the malware. The scan engine 110 illustrated in FIG. 1 may employ this known technique of scanning a file for a malware signature. Also, increasingly, heuristic techniques are employed when identifying data characteristic of malware that may be used by the scan engine 110. However, it should be well understood that the examples described herein should be construed as exemplary and not limiting, as the scan engine 110 may employ any one of a number of existing, or yet to be developed, malware detection techniques.

The scan engine 110 may be optimized to scan a file by only searching data in a file that has the potential to expose a computer to the effects of malware. In modern computer systems, data is typically associated with a file that describes attributes of the file. A scan engine that searches for malware in a file without the context of data that is associated with a file is inefficient. For example, the scan engine 110 may search the header of a file and determine that the file is incapable of exposing a computer to the effects of malware. In this instance, the scan engine 110 will not scan subsequent portions of the file because those subsequent portions are not capable of implementing the effects of malware. By way of another example, the scan engine 110 may search data contained in the header of a file and determine that segments of data in the file have the potential to expose a computer to the effects of malware. In the context of a Microsoft Word™ document, data associated with the document identifies locations within the document that contains "macros" or "embedded objects" with executable program code. In this instance, the scan engine 110 searches the data in the file and identifies the locations within the document that have the potential to expose a computer to the effects of malware. Then, the scan engine 110 requests and scans data located in these areas of the document. While a scan engine that only scans data needed to determine whether a file contains malware is an optimization over the prior art, it may result in a significant number of time-consuming "seek" operations. As described in further detail below, one aspect of the present invention is directed to minimizing the number of "seek" operations performed when scanning a file for malware.

As illustrated in FIG. 1, the antivirus software 108 in which aspects of the present invention may be implemented also includes a bit map cache 112. The present invention will typically be used in conjunction with a system that selectively scans one or more files on a computer for malware. The existing system associates a variable with a file when a scan of the file is performed. If the variable indicates that the file is malware, any attempt to access the file by the user fails. Conversely, if the variable indicates that the file is not malware and data in the file has not been modified, an attempt to execute the file will succeed without requiring an additional scan of the file to be performed. As described in further detail below, the information necessary to determine whether a scan of the file is necessary is maintained in the bit map cache 112.

Figure 2:
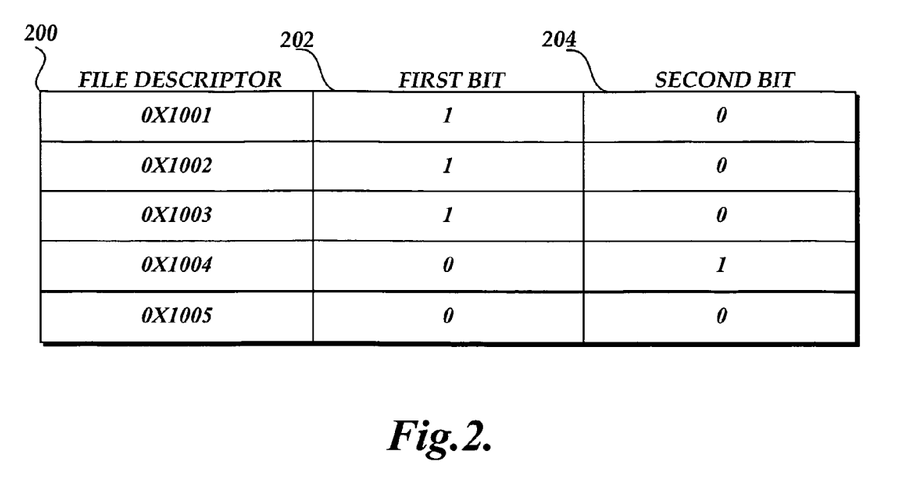
FIG. 2 is a pictorial depiction of an exemplary bit map cache that may be used in conjunction with the present invention to selectively scan a file for malware.

For illustrative purposes and by way of example only, the contents of a sample bit map cache 112 are shown in FIG. 2 As illustrated, the bit map cache 112 consists of three columns, each of which contains multiple entries. The columns are identified as FILEINDX 200, FIRST BIT 202, and SECOND BIT 204. The FILEINDX 200 field contains a value that is used to uniquely identify a file. As known to those skilled in the art and others, a computer-readable medium such as a hard drive, is typically partitioned into logical units referred to as volumes. Each volume has a central location where information about files on the volume is stored, including a unique identifier that is used to access a file internally. This value is an inserted into the FILEINDX 200 column of the bit map cache 112. The FIRST BIT 202, and SECOND BIT 204 fields each store a value that collectively identifies the state of the file. For example, both the FIRST BIT 202 and SECOND BIT 204 fields contain a value that is either a "0" or a "1." In one system, if the FIRST BIT 202 field contains a "1" and the SECOND BIT 204 field also contains a "0," then the state of the file is "known malware." Alternatively, if the FIRST BIT 202 field contains a "0" and the SECOND BIT 204 field contains a "1," then the state of the file is "known good." Also, if the FIRST BIT 202 field contains a "0" and the SECOND BIT 204 field contains a "0," then the state of the file is "unknown." Although FIG. 2 illustrates a bit map cache 112 that has specific attributes, those skilled in the art will appreciate that the bit map cache 112 may operate with more or fewer than all of the listed attributes.

The antivirus software 108 is configured to perform a lookup in the bit map cache 112 when a scanning event is identified. As described above, the variables associated with a file in the bit map cache 112 dictates whether the file will be scanned for malware. In instances when a file was not previously scanned or the contents of the file have been modified, the antivirus software 106 causes a scan to be performed and updates the bit map cache 106 to reflect the results of the scan. If the file was previously scanned and the contents of the file have not changed, the antivirus software 106 does not perform a scan, thereby minimizing the computational resources used by the antivirus software 106. In this regard, a detailed explanation of a system and method that tracks whether a file needs to be scanned for malware may be found in commonly assigned, copending U.S. patent application Ser. No. 10/984,614, entitled "System and Method for Aggregating the Knowledge Base of Antivirus Software Applications," the content of which is expressly incorporated herein by reference.

Aspects of the present invention may be used to populate the contents of the bit map cache 112 before an "on access" or "on demand" scan of a file occurs. As described previously, the present invention is implemented in conjunction with a memory manager 106 that "pre-fetches" or loads data in system memory 104 based on the expected demands of a user. To improve the performance of the antivirus software 108, a scan for malware is performed when the memory manager 106 "pre-fetches" data into the system memory 104. For example, when a computer begins functioning, the memory manager 106 will typically load data from a plurality of files into system memory 104 in anticipation that a user will cause one or more application programs associated with the files to be executed. In this instance, data loaded in system memory 104 may be scanned for malware "in the background" before an application program is executed. After the scan is performed, the contents of the bit map cache 112 are updated to reflect the results of the scan. As a result, when a user initiates a launch of an application program that uses data "pre-fetched" into the system memory 104, the operations that determine whether an application program needs to be scanned for malware will have already been performed.

As illustrated in FIG. 1, the antivirus software 108 also includes an efficient scan module 114 that contains software routines and logic implemented by the present invention. Since functions and different embodiments of the efficient scan module 114 are described below with reference to FIG. 3, a detailed description of the module 114 will not be provided here. However, generally described, the module 114 implements logic to reduce or eliminate the overhead involved in scanning a file for malware. For example, one aspect of the efficient scan module 114 efficiently reads data from a storage device (e.g., the computer-readable medium 102) into memory accessible to a CPU (e.g., the system memory 104). In this regard, the efficient scan module 114 identifies an optimal pattern to load data in the file into system memory based on how the scan engine 110 accesses data in the file. Data that describes a pattern used to scan each file on a computer for malware is stored in a persistent data store 116 and updated each time a file is scanned.

As known to those skilled in the art and others, FIG. 1 is a simplified example of one computer 100 capable of performing the functions of the present invention. Actual embodiments of the computer 100 will have additional components not illustrated in FIG. 1 or described in the accompanying text. Also, FIG. 1 shows one component architecture for minimizing the overhead required in scanning a file for malware, but other component architectures are possible. Thus, the components illustrated in FIG. 1 should be construed as exemplary and not limiting.

Now with reference to FIG. 3, an exemplary embodiment of an efficient scan module 114 illustrated in FIG. 3 that minimizes the overhead involved in scanning a file for malware will be described.

At decision block 300, the efficient scan module 114 remains idle and waits until a scanning event is identified. Those skilled in the art and others will appreciate that antivirus software may initiate a scan for malware in many different circumstances. As described above with reference to FIG. 1, existing antivirus software will typically perform a scan for malware "on access" when a user or software system selects an application program for execution. Since executing an application program may expose a computer to malware, the files associated with the application program are scanned before execution is initiated. Moreover, existing antivirus software is typically configured to perform a scan "on demand" when a user or software system generates a command that causes a volume or other logical partition of data to be scanned for malware. The efficient scan module 114 may also be implemented in conjunction with antivirus software that performs a scan for malware "on access" and/or "on demand" to improve the speed in which a scan is performed.

As mentioned above, the efficient scan module 114 may also be implemented with a software system that uses heuristics to "pre-fetch" data into system memory in anticipation that a user will cause an application program to be executed. Data required to execute the application program is scanned for malware when loaded into system memory before the user issues the command to execute the program. In one embodiment of the present invention, data is loaded into system memory and a scan for malware is performed "in the background" without requiring input from the user. Moreover, the present invention may cause data to be "pre-fetched" into system memory and scanned for malware when computer resources (e.g., the CPU) on the computer are idle thereby minimizing the impact of scanning data for malware.

At decision block 302, a determination is made regarding whether the scanning event identified at block 300 is a "batch job" that requires scanning a plurality of files. Stated differently, aspects of the present invention may either scan a single file for malware or a plurality of files. When a plurality or "batch" of files is scheduled to be scanned for malware, aspects of the present invention schedule files to be scanned in an order that maximizes resource utilization of the computer. In any event, if a single file will be scanned for malware, the efficient scan module 114 proceeds to the block 306 described in further detail below. Conversely, if a plurality of files will be scanned, the efficient scan module 114 proceeds to block 304.

Figure 3:
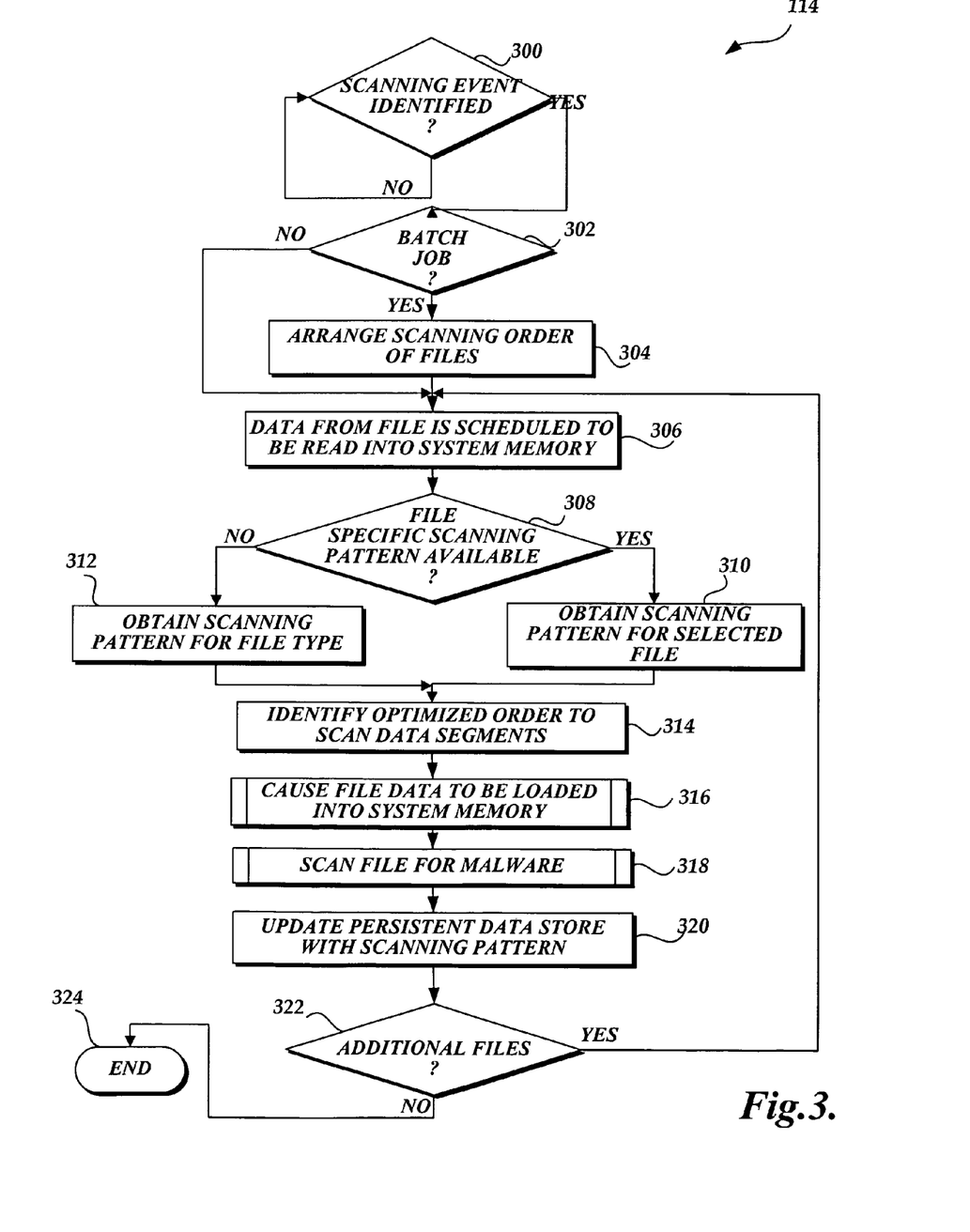
FIG. 3 is a flow diagram illustrating one exemplary embodiment of a method that efficiently performs a scan for malware that is formed in accordance with the present invention.

As illustrated in FIG. 3, at block 304, the efficient scan module 114 arranges the order in which files will be scanned for malware that optimizes the use of computer resources. If block 304 is reached, a plurality of files is scheduled to be scanned for malware as a result of the scanning event identified a block 300. In accordance with one aspect of the present invention, the files are scheduled to be read into system memory and scanned in a way that maximizes resource usage on the computer. Those skilled in the art and others will recognize that antivirus software typically needs two resources to scan a file for malware, including (1) a CPU and (2) a storage device (e.g., the computer readable medium 102) where the file data is stored. As mentioned previously, in reading file data into system memory, a CPU may become "blocked" waiting for the necessary data. In this instance, when the CPU is required to perform minimal processing on a large amount of data, overall effective processing speed is reduced because the CPU is forced to wait. As a result, the application that requested data be read into system memory is referred to as "CPU bound" in that the CPU will remain idle until data becomes available from the storage device. The "bottleneck" in computer performance caused by CPU-bound applications, led software engineers to develop systems in which multiple requests to read data are scheduled to occur asynchronously with other processing performed by an application program. In some systems, multiple requests to read data into system memory are input into a queue so that when an I/O request is initiated, control may be returned to the calling program. As a result, processing performed by an application program does not wait for completion of the I/O request before continuing execution. Instead, a queue dispatches asynchronous reads requests in order to load required file data from multiple files into system memory. In this type of system, those skilled in the art and others will recognize that resource utilization is maximized when scans for CPU bound files are scheduled together and overlap with scans for I/O bound files.

At block 304, the efficient scan module 114 separates files that will be scanned for malware into "CPU bound" and "I/O bound" files. In accordance with one embodiment of the present invention, the files are separated based on file type. For example, antivirus software developers have recognized that certain file types will result in a CPU bound scan for malware in which a large amount of processing will be performed on a relatively small amount of data. Similarly, other file types are more likely to result in an I/O bound scan for malware. A file that will cause an I/O bound scan for malware is matched with and will be scheduled congruently with a file that will cause a CPU bound scan for malware. Stated differently, when scanning a plurality of files, multiple requests to read file data into system memory that are scheduled in a queue will contain both I/O bound and CPU bound files. As a result, the resources of the computer are maximized when scanning a plurality of files for malware.

At block 306, data from a file that is an object of the scanning event identified a block 300 is selected or scheduled to be read into system memory. When block 306 is reached, the efficient scan module 114 may either be scanning a single file or a plurality of files for malware. As mentioned above, in some systems when a request to read file data into system memory is made by an application program, such as antivirus software, the request is placed in a queue along with other requests. Thus, in one embodiment, an existing system that uses a queue to schedule and satisfy I/O requests "selects" or schedules a file to be read into system memory based on an algorithm that is "fair." Since these existing systems are generally known in the art, further description of the systems will not be described in detail here. However, it should be well understood that a request to read data into system memory may be performed using different systems and that the examples described herein should be construed as exemplary and not limiting.

As illustrated in FIG. 3, at decision block 308, the efficient scan module 114 determines whether a file specific scanning pattern for the selected file is known. As mentioned previously, in one embodiment of the present invention a software module (e.g., the scan engine 110) only analyzes data in a file that is necessary to determine whether the file is infected with malware. Since certain portions of the file may not be capable of exposing a computer to the effects of malware, all data in the file is not necessarily loaded into system memory and scanned. Instead, segments of data that may be capable of implementing the malicious functionality of malware are identified and loaded into system memory. As mentioned previously, a software module that only scans relevant portions of a file for malware may cause a significant number of "seek" operations in which a read/write head is required to obtain data from remote locations on a computer-readable medium to be performed. The pattern in which data in a file is accessed by a scan engine is stored in a database (e.g., the persistent data store 116) and updated each time a scan is performed. Thus, at block 308, the efficient scan module 114 determines whether a file specific scanning pattern is available by querying a database (e.g., the persistent data store 116). If the database maintains an entry for the selected file with data that describes a scanning pattern, the efficient scan module 114 proceeds to block 310. Conversely, if the database does not maintain an entry for the selected file with data that describes a scanning pattern, the efficient scan module 114 proceeds to block 312, described below.

Figure 4:
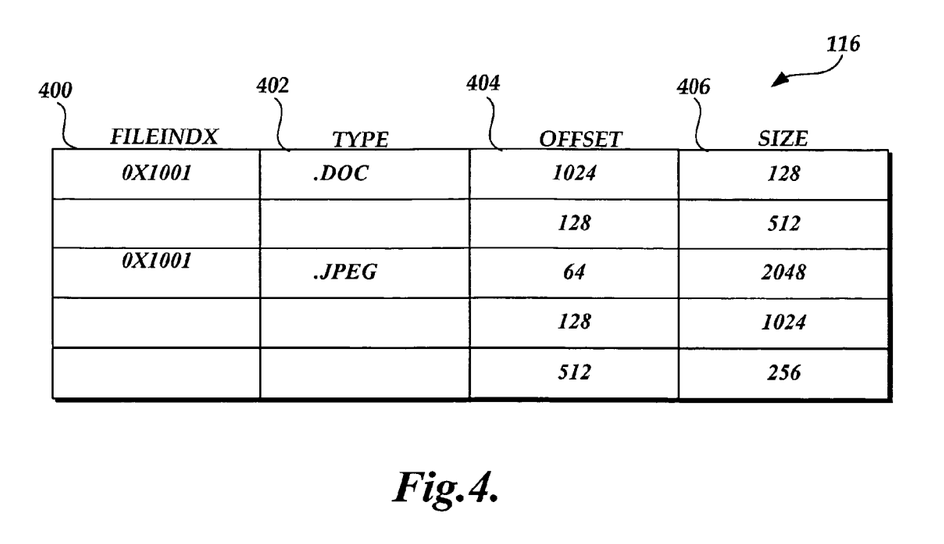
FIG. 4 is a pictorial depiction of an exemplary persistent data store that tracks the segments of data in a file that are loaded into system memory when a file is scanned for malware in accordance with the present invention.

At block 310, the efficient scan module 114 obtains a scanning pattern for the file selected at block 306. As mentioned previously, data that describes how a file is scanned is maintained in a database (e.g., the persistent data store 116). For illustrative purposes and by way of example only, the contents of an exemplary persistent data store 116 are shown in FIG. 4. As illustrated, the persistent data store 116 consists of four columns, each of which contains multiple entries. The columns are identified as FILEINDX 400, TYPE 402, OFFSET 404, and SIZE 406. Similar to the FILEINDX 200 field maintained in a bitmap cache 112, described above with reference to FIG. 2, the FILEINDX 400 field illustrated in FIG. 4 contains a value that uniquely identifies a file on the volume where the file is stored. The TYPE 402 field contains a value used to identify the format of a file. Those skilled in the art and others will recognize that files typically adhere to well-defined formats. As described in further detail below, files of the same type will typically have common traits that are used in defining a default scanning pattern when a file specific scanning pattern is not available. The OFFSET 404 and SIZE 406 fields store values that collectively identify segments of data in a file that were loaded into system memory and analyzed in a scan of the file. For example, in one embodiment of the present invention the OFFSET 404 field contains a value that identifies the number of bytes from the beginning of the file where a segment of data was obtained when a scan of the file was performed. The value maintained in the associated SIZE 406 field identifies the total number of bytes that were obtained starting from the location represented in the OFFSET 404 field.

In one embodiment of the present invention, each file on a volume that has been scanned for malware maintains an entry in the persistent data store 116. However, the resource requirements of storing data that describes a scanning pattern for every file on the volume may not provide the desired performance benefits on some computer systems. Thus in an alternative embodiment, only the most frequently scanned files maintain an entry in the persistent data store 116. As described in further detail below (at block 312) access patterns from the most frequently scanned files may be used to predict access patterns for a file of a particular type.

Returning to FIG. 3, at block 310, the efficient scan module 114 obtains data that identifies the segments of data (e.g., offset and size) in a file that were loaded into system memory and analyzed in a scan of the file. Simply stated, the efficient scan module 114 is able to obtain the data that identifies the segments of data that were loaded into system memory by querying the persistent data store 116 with a function call.

At block 312, the efficient scan module 114 obtains a scanning pattern for the type of file that was selected at block 306. If block 312 is reached, a file specific scanning pattern is not available from the persistent data store 116 which may occur, for example, if the selected file was not previously scanned for malware. Alternatively, a file specific scanning pattern may not be available from the persistent data store 116 because the present invention may be configured to only store a scanning pattern for the most frequently used files. In this instance, the efficient scan module 114 will load data into system memory based on data obtained from scans performed on files of the same type as the selected file. Those skilled in the art and others will recognize that files that are the same type typically maintain common characteristics such as the same file extension (e.g. ".EXE", ".DOC", etc.) that may be used to differentiate these files from other file types. However, those skilled in the art and others will recognize that other characteristics besides a file extension may be used to differentiate between file types.

As mentioned previously, files stored on a computer typically adhere to well-defined formats and therefore have common traits. The commonality between files of the same type may be used to define a default scanning pattern for the file selected at block 306. For example, some file types maintain data in a file header that identifies locations into a file where executable program code that has the potential to expose a computer to malware is located. In this instance, a scan engine will always access data in the header of a particular file type. In accordance with one embodiment of the present invention, the efficient scan module 114 identifies locations in files of the same type that are always scanned for malware. For example, using techniques that are generally known in the art, a query may be passed to the persistent data store 116 that returns the location of data segments in a file that is always scanned for malware. However, those skilled in the art and others will recognize that the technique for identifying a default scanning pattern described above should not be construed as limiting. For example, in alternative embodiments, the efficient scan module 114 may parse data in a file and identify locations that are likely to be needed by a scan engine.

Figure 5:
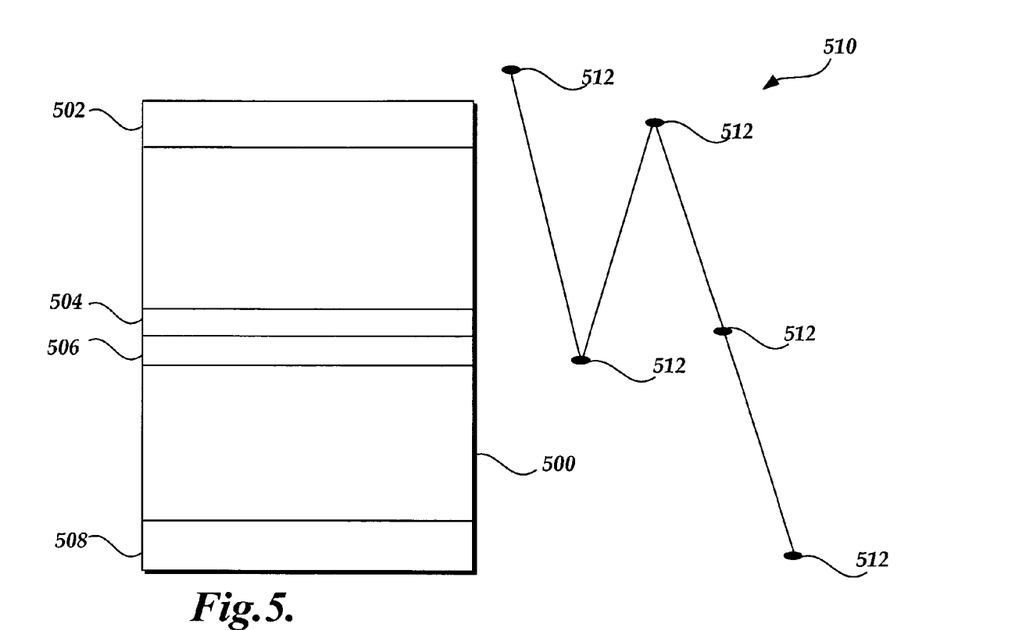
FIG. 5 is the pictorial depiction of a computer-readable medium and a method for accessing a file stored on the computer-readable medium that is formed in accordance with the prior art.

At block 314, the efficient scan module 114 identifies an optimized order in which segments of data in the selected file will be loaded from a computer-readable medium into system memory. For illustrative purposes and by way of example only, FIG. 5 depicts an exemplary computer-readable medium 500 that stores data segments 502, 504, 506, and 508 in a file (not shown) that will be loaded into system memory and scanned for malware in accordance with the prior art. In this regard, FIG. 5 illustrates an exemplary scanning pattern 510 that shows the movement of the computer-readable medium 500 in relation to a read/write head 512 when the data segments 502, 504, 506, and 508 are loaded into system memory. A scan engine first requests data segment 506 which results in the computer-readable medium 500 moving so that the read/write head 512 is located adjacent to the data segment 506. When the read/write head 512 is adjacent to the data segment 506, the data requested by the scan engine is loaded into system memory. As illustrated in FIG. 5, the scan engine then requests the data segment 502. Similar to the description provided above, the computer-readable medium 500 then moves so that the read/write head 512 is adjacent to the data segment 502. Then, the data segment 502 is read into system memory. As further illustrated in FIG. 5, data segments 504 and 508 are subsequently loaded into system memory using the same techniques. When a data segment is loaded into system memory using techniques that exist in the prior art, an excessive number of "seek" operations are performed which cause a computer-readable medium to move between noncontiguous segments of data.

Figure 6:
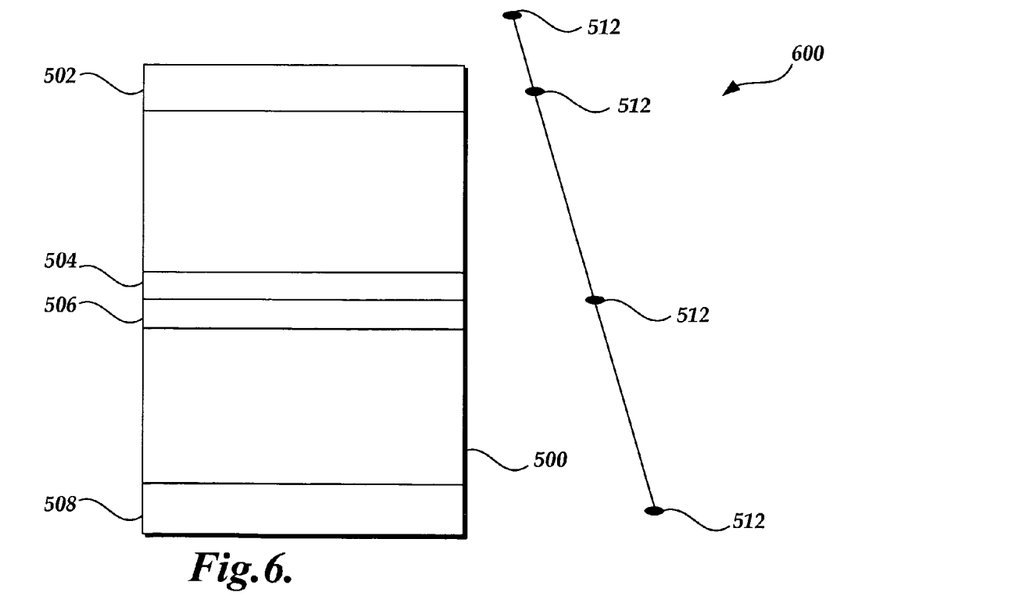
FIG. 6 is the pictorial depiction of a computer-readable medium and a method for accessing the computer-readable medium that is formed in accordance with the present invention.

Now with reference to FIG. 6, an optimized scanning pattern 600 that is implemented by aspects of the present invention is described. FIG. 6 contains the same computer-readable medium 500 and data segments 502, 504, 506, and 508 that are illustrated in FIG. 5. As mentioned previously, the efficient scan module 114 causes data that is likely to be scanned for malware to be loaded into system memory before the data is needed. Also, the data will typically be accessed in a way that minimizes the number of seek operations that need to be performed. For illustrative purposes and by way of example only, FIG. 6 depicts an exemplary scanning pattern 600 that may be identified by aspects of the present invention. Similar to FIG. 5, a scan engine may request the data segments 502, 504, 506, and 508 in any order without regard for the location of the data segments in relation to each other. However since the data segments 502, 504, 506, and 508 are being loaded into system memory before they are needed, they may be accessed in an order that minimizes the time requirements of the loading process. As illustrated in FIG. 6, the optimizations performed by the efficient scan module 114 may include but are not limited to (1) loading contiguous data segments at the same time to minimize the number of seek operations that are performed, (2) loading data segments in an order that minimizes movement of the computer-readable medium 500 under a read/write head 512, and (3) loading noncontiguous data segments that are separated by a small and unnecessary data segment in the same operation. Moreover, the efficient scan module 114 may determine that loading all file data into system memory may be more efficient than loading segments of data. This may occur, for example, when a small file with data that is contiguously stored on a computer-readable medium is the object of a scanning event.

Returning to FIG. 3, at block 316 the efficient scan module 114 causes data that is likely to be scanned for malware to be loaded into system memory. Those skilled in the art and others will recognize that a component of the operating system commonly referred to as a "loader" is responsible for copying data from a computer-readable medium into system memory. However, while a loader typically copies the data when needed, aspects of the present invention cause the loader to copy the necessary data in anticipation that the data will be needed.

As illustrated in FIG. 3, at block 318 a scan of the file selected at block 306 is performed. As mentioned previously, a known technique that may be employed to scan a file for malware includes obtaining a copy of the malware "in the wild." Then the data that implements the malware is processed with a hash function that converts the data, or a characteristic subset of the data, into a signature that uniquely identifies the malware. However, it should be well understood that the example signature-based technique of scanning for malware described herein should be construed as exemplary and not limiting, as the present invention may be used in conjunction with any number of malware detection techniques. At block 318, performing the scan may include searching data loaded into system memory for a signature that is associated with malware. Moreover, those skilled in the art and others will recognize that in certain instances additional data will need to be loaded into system memory. For example, if the contents of the selected file were modified since the most recent scan for malware, the scanning pattern used to predict data that needs to be loaded into system memory may not be completely "up-to-date." However, a scan engine may still request data that was not previously loaded into system memory and have the request be satisfied by existing systems.

At block 320, a database (e.g., the persistent data store 116) is updated with information that describes the scanning pattern in which data in the selected file was accessed and scanned at block 318. As mentioned previously, a scan engine may access segments of data from a file in any order to determine whether the file contains malware. Aspects of the present invention track how the data is accessed when a scan is performed and records this information in a database (e.g., the persistent data store 116). Then, in anticipation that another scan of the file will be needed, the database (e.g., the persistent data store 116) is queried and the segments of data that were previously accessed when a scan occurred are loaded into system memory before the data is needed. In any event, at block 320 data in a database (e.g., the persistent data store 116) is updated with information that describes segments of data that were accessed and scanned at block 318.

At decision block 322, the efficient scan module 114 determines if any files that were scheduled to be scanned for malware at block 300 have not previously been selected. If additional file(s) will not be selected, the efficient scan module 114 proceeds to block 324, where it terminates. Conversely, if at least one additional file will be selected, the efficient scan module 114 proceeds back to block 306 and blocks 306 through 322 repeat until all of the files that were the object of a scanning event have been selected.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer that includes system memory and a computer storage device that stores a file, the system memory accessible to a Central Processing Unit, a method of loading data in the file into the system memory in anticipation that the file will be scanned for malware, the method comprising:
  (a) identifying a pattern in which data in the file was loaded into system memory when scanned for malware;
  (b) determining an optimal seek pattern based on the identified pattern;
  (c) generating a load pattern in which data from the file, used to determine whether the file is infected with malware, is loaded into system memory from the computer storage device that minimizes reading time required to read the data from the file based on the optimal seek pattern, wherein the optimal seek pattern identifies an optimized order in which the data in the file is loaded into the system memory;
  (d) computing a priority score for the data;
  (e) computing priority scores for other data;
  (f) pre-fetching the data in the file into system memory in accordance with the generated load pattern, the data pre-fetched prior to any actual demand for the data, the data pre-fetched based on an expected demand for the data as determined by the priority score for the data relative to priority scores for the other data;

wherein generating the load pattern includes:
determining a file type for the file;
determining if a known scanning pattern is available for the file, the scanning pattern for scanning the data from the file used to identify malware;
if no known scanning pattern is available, accessing a second scanning pattern in which data of a second file that is different from the file was loaded into system memory, wherein the second file is of the same file type as the file and wherein the second file is one of a plurality of files that have been previously scanned to create scanning patterns for data from the files used to identify malware; and
generating a default scanning pattern for the file based on the second scanning pattern.

2. The method as recited in claim 1, further comprising scanning data in the file for malware using a scan engine that requests segments of data without regard for a location of the segments of data.

3. The method as recited in claim 2, wherein identifying a pattern in which data in the file was previously loaded into system memory when scanned for malware includes recording an offset and a size of the segments of data.

4. The method as recited in claim 3, wherein the segments of data in the file that are loaded into system memory are those segments of data that were loaded into system memory from the second file.

5. The method as recited in claim 2, wherein generating the load pattern in which data from the file, used to determine whether the files is infected with malware, is loaded into system memory from the computer storage device that minimizes the reading time required to read data from the file includes determining whether contiguously loading all of the data in the file is faster than loading the needed segments of data.

6. The method as recited in claim 2, wherein generating the load pattern in which data from the file, used to determine whether the files is infected with malware, is loaded into system memory from the computer storage device that minimizes the reading time required to read data from the file includes loading contiguous segments of data together to minimize the number of seek operations that are performed.

7. The method as recited in claim 2, wherein generating the load pattern in which data from the file, used to determine whether the files is infected with malware, is loaded into system memory from the computer storage device that minimizes the reading time required to read data from the file includes loading segments of data in an order that minimizes movement of the computer storage device.

8. The method as recited in claim 1, wherein loading data in the file into system memory is performed on demand when a user issues a command to scan the file.

9. The method as recited in claim 1, wherein loading data in the file into system memory is performed on access when a user attempts to access data in the file.

10. The method as recited in claim 1, wherein loading data in the file into system memory is performed using a system that employs heuristics to load data into the system memory based on the needs of the user.

11. A system for efficiently scanning a file for malware, the system comprising:

a computer that includes a system memory that stores a file and a processor, the processor configured to execute one or more of a scan engine and an efficient scan module, wherein:
(a) the scan engine is for identifying data that is characteristic of malware;
(b) a persistent data store is for tracking the segments of data in the file that are loaded into system memory when a scan of the file for malware is performed;
(c) the efficient scan module operative to:
(i) populate the data store with the location of the segments of data that are loaded into system memory when a scan of the file for malware is performed;
(ii) identify a load pattern in which data from the file, used to determine whether the file is infected with malware, is loaded into system memory from the computer storage device based on an optimal seek pattern of the tracked segments of data that minimizes reading time required to read the data from the file, wherein the optimal seek pattern identifies an optimized order in which the segments of data in the file are loaded into the system memory;
(d) a memory manager configured to:
(i) compute a priority score for the data;
(ii) compute priority scores for other data; and
(iii) pre-fetch the data in the file into system memory in accordance with the load pattern, the data pre-fetched prior to any actual demand for the data, the data pre-fetched based on an expected demand for the data as determined by the priority score for the data relative to the priority scores for other data; and
wherein identifying the load pattern includes:
determining a file type for the file;
determining if a known scanning pattern is available for the file, the scanning pattern for scanning the data from the file used to identify malware;
if no known scanning pattern is available, accessing a second scanning pattern in which data of a second file that is different from the file was loaded into system memory, wherein the second file is of the same file type as the file and wherein the second file is one of a plurality of files that have been previously scanned to create scanning patterns for data from the files used to identify malware; and
generating a default scanning pattern for the file based on the second scanning pattern.

12. The system as recited in claim 11, wherein the efficient scan module is further configured to cause segments of data in the file to be loaded into system memory by the memory manager in accordance with the load pattern that minimizes the reading time required to read data in the file.

13. The system as recited in claim 11, further comprising:
(a) a bit map cache that tracks whether the file was modified since being scanned for malware; and
(b) wherein the scan engine does not scan the file for malware if data in the bit map cache indicates that the file was not modified since being scanned for malware.

14. A computer program product for use at a computer system, the computer program product for implementing a method for loading data in the file into the system memory in anticipation that the file will be scanned for malware, the computer program product comprising a computer storage device having stored thereon computer-executable instructions that, when executed by a processor, cause the computer system to perform the method, including the following:

(a) identify a pattern in which data in the file was loaded into system memory when scanned for malware;
(b) determine an optimal seek pattern based on the identified pattern;
(c) generate a load pattern in which data from the file, used to determine whether the file is infected with malware, is loaded into system memory that minimizes reading time required to read the data from the file based on the optimal seek pattern, wherein the optimal seek pattern identifies an optimized order in which the data in the file is loaded into the system memory;
(d) compute a priority score for the data;
(e) compute priority scores for other data;
(f) pre-fetch the data in the file into system memory in accordance with the load pattern, the data pre-fetched prior to any actually demand for the data, the data pre-fetched based on an expected demand for the data as determined by a calculated priority for the data; and
wherein generating the load pattern includes:
  determining a file type for the file;
  determining if a known scanning pattern is available for the file, the scanning pattern for scanning the data from the file used to identify malware;
  if no known scanning pattern is available, accessing a second scanning pattern in which data of a second file that is different from the file was loaded into system memory, wherein the second file is of the same file type as the file and wherein the second file is one of a plurality of files that have been previously scanned to create scanning patterns for data from the files used to identify malware; and
  generating a default scanning pattern for the file based on the second scanning pattern.

15. The computer program product as recited in claim 14, wherein generating the load pattern in which data in the file, used to determine whether the file is infected with malware, is loaded into system memory that minimizes the reading time required to read data in the file includes:
  (a) determining whether contiguously loading all of the data in the file is faster than loading the needed segments of data; and
  (b) determining whether loading non-contiguous data segments should be loaded in a single operation.

16. The computer program product as recited in claim 14, wherein generating the load pattern in which data in the file, used to determine whether the file is infected with malware, is loaded into system memory that minimizes the reading time required to read data in the file includes loading segments of data in an order that minimizes movement of the computer storage device.

* * * * *